United States Patent
Seeger et al.

(10) Patent No.: US 12,348,336 B2
(45) Date of Patent: Jul. 1, 2025

(54) SYSTEM AND METHOD FOR GENERATING MODULATED RF SIGNALS FOR CONTROLLING OR READING-OUT A MULTIPLE-STATE SYSTEM

(71) Applicant: Rohde & Schwarz GmbH & Co. KG, Munich (DE)

(72) Inventors: Julius Seeger, Prien am Chiemsee (DE); Philipp Kurpiers, Moosburg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 118 days.

(21) Appl. No.: 18/470,641

(22) Filed: Sep. 20, 2023

(65) Prior Publication Data

US 2025/0097075 A1    Mar. 20, 2025

(51) Int. Cl.
*H04L 25/02* (2006.01)
*G02F 1/35* (2006.01)
*G06N 10/40* (2022.01)

(52) U.S. Cl.
CPC .......... *H04L 25/0204* (2013.01); *G02F 1/353* (2013.01); *G06N 10/40* (2022.01); *G02F 2203/56* (2013.01)

(58) Field of Classification Search
CPC .......... H04L 25/0204; H04L 25/03343; H04L 25/03178; H04L 25/03165; H04L 25/0202; G06N 10/40; G06N 10/20; G06N 10/00; G02F 1/353

See application file for complete search history.

(56) References Cited

U.S. PATENT DOCUMENTS

| | | |
|---|---|---|
| 5,930,692 A | 7/1999 | Peterzell et al. |
| 6,429,738 B1 | 8/2002 | Kenington |
| 7,277,683 B2 | 10/2007 | Dosanjh et al. |
| 7,327,992 B2 | 2/2008 | Earls et al. |
| 7,343,135 B2 | 3/2008 | Manku |

(Continued)

FOREIGN PATENT DOCUMENTS

| | | |
|---|---|---|
| CN | 103634712 B | 8/2016 |
| EP | 1 020 041 B1 | 4/2004 |

*Primary Examiner* — Khanh C Tran
(74) *Attorney, Agent, or Firm* — Studebaker Brackett PLLC

(57) ABSTRACT

A modulated RF signals generating system for controlling or reading-out a multiple-state system, such as a quantum computing architecture or a multiple-input multiple-output architecture, is provided. The system includes a baseband signal generator having a baseband signal generator output(s), a reference frequency source being in unidirectional or bidirectional communication with the baseband signal generator, a multitone source including multitone source output(s) and being in unidirectional or bidirectional communication with the reference frequency source to lock the corresponding phase between the baseband signal generator and the multitone source, and mixer(s) including a first mixer input, a second mixer input(s) and a mixer output. The corresponding one of the baseband signal generator output(s) is connected to the first mixer input of the respective one of the mixer(s). The corresponding one of the multitone source output(s) is connected to the second mixer input of the respective one of the mixer(s).

20 Claims, 8 Drawing Sheets

(56) References Cited

U.S. PATENT DOCUMENTS

| | | | |
|---|---|---|---|
| 9,236,836 B2 | 1/2016 | Fernandez | |
| 9,678,123 B2 | 6/2017 | Dunsmore et al. | |
| 9,791,484 B2 * | 10/2017 | Pailloncy | G01R 27/02 |
| 11,043,939 B1 * | 6/2021 | Szmuk | H03L 7/099 |
| 11,346,921 B2 | 5/2022 | Itkin | |
| 2005/0226349 A1 | 10/2005 | Manku | |
| 2006/0141952 A1 | 6/2006 | Kung et al. | |
| 2020/0169434 A1 * | 5/2020 | Tangudu | H04B 1/525 |
| 2022/0229155 A1 | 7/2022 | Schrattenecker et al. | |
| 2023/0131584 A1 | 4/2023 | Bayer et al. | |

* cited by examiner

SYSTEM AND METHOD FOR GENERATING MODULATED RF SIGNALS FOR CONTROLLING OR READING-OUT A MULTIPLE-STATE SYSTEM

TECHNICAL FIELD

The disclosure relates to the generation of modulated RF signals for controlling or reading-out a multiple-state system such as a quantum computing architecture or a multiple-input multiple-output architecture. In particular, the disclosure relates to a modulated RF signals generating system for controlling or reading-out a multiple-state system, a system comprising such a modulated RF signals generating system and a multiple-state system, preferably a quantum computing architecture or a multiple-input multiple-output architecture, and a method for generating modulated RF signals for controlling or reading-out a multiple-state system.

BACKGROUND ART

To solve complex problems, quantum computers exploit natural quantum properties. As with conventional bits, logic states are represented and processed using quantum bits (qubit). Whereas a conventional bit is binary, a qubit can simultaneously exist in combinations of two states. This phenomenon is known as superposition and cannot be explained using the laws of classical physics.

The energy state of a qubit can be controlled with external microwave signals. The corresponding control process can be illustrated with the aid of a Bloch sphere. The one and zero logic states are located at the north and south poles of the Bloch sphere. Every other point on the surface of the sphere corresponds to a superposition state. The current state is indicated by the so-called state vector. Interaction with a resonant microwave signal causes rotation of the state vector in the Bloch sphere.

To perform dependable computing operations with qubits, this rotation needs to be controlled with great precision especially based on the pulse length, microwave signal amplitude and the control pulse envelope. Typically, for such a control of a qubit, which can be seen as a multiple-state system, a high number of modulated radio frequency signals is used, wherein each or each subset, respectively, of said radio frequency signals requires a respective radio frequency signal generator with its own local oscillator source, thereby disadvantageously requiring many individual local oscillator sources and a high number of cables, which is particularly of disadvantage when arranged in a cryostat.

It is noted that this can analogously apply for multiple-input multiple-output (MIMO) applications especially comprising multiple antenna elements, which can also be seen as a multiple-state system.

SUMMARY

Thus, there is a need to provide a system for generating a high number of modulated RF signals for controlling or reading-out a multiple-state system, a system comprising such a modulated RF signals generating system and a multiple-state system, and a modulated RF signals generating method for controlling or reading-out a multiple-state system, wherein the number of required local oscillator source is significantly reduced, thereby not only saving costs but also increasing phase stability between corresponding radio frequency channels.

This is achieved by the embodiments provided in the enclosed independent claims. Advantageous implementations of the present disclosure are further defined in the dependent claims.

According to a first aspect of the present disclosure, a system for generating a multitude of modulated RF signals for controlling or reading-out a multiple-state system, such as a quantum computing architecture or a multiple-input multiple-output architecture, is provided. Said modulated RF signals generating system for controlling or reading-out a multiple-state system comprises a baseband signal generator comprising at least one baseband signal generator output, a reference frequency source being in unidirectional or bidirectional communication with the baseband signal generator, a multitone source comprising at least one multitone source output and being in unidirectional or bidirectional communication with the reference frequency source to lock the corresponding phase between the baseband signal generator and the multitone source, and at least one mixer comprising a first mixer input, at least one second mixer input and a mixer output. In this context, the corresponding one of the at least one baseband signal generator output is connected to the first mixer input of the respective one of the at least one mixer. In addition to this, the corresponding one of the at least one multitone source output, especially the multitone source output, is connected to the second mixer input of the respective one of the at least one mixer, especially to the second mixer input of each of the at least one mixer.

Advantageously, the number of required local oscillator source is significantly reduced, thereby not only saving costs but also increasing phase stability between corresponding radio frequency channels. Additionally, less space is required due to fewer local oscillator sources.

Further advantageously, less power consumption can be achieved especially due to the reduced number of local oscillator sources.

With respect to the above-mentioned term "read-out system", it is noted that said term may especially not to be understood in a manner that the system according to the first aspect of the present disclosure is configured to act as a sensor. In fact, the system according to the first aspect can rather be used to generate a part of the corresponding read-out sequence, i.e. the radio frequency pulses required for this purpose.

With respect to the above-mentioned multitone source, it is noted that said multitone source may especially be configured to synthesize at least two different frequencies simultaneously.

With respect to the above-mentioned unidirectional communication, it is noted that said unidirectional communication may especially be understood as a signal direction from the reference frequency source to the baseband signal generator or to the multitone source, respectively.

It is further noted that it might be particularly advantageous if the reference frequency source is shared by the baseband signal generator and the multitone source preferably to lock the corresponding phase between the baseband signal generator and the multitone source.

According to an implementation form of the first aspect of the present disclosure, the multitone source is fed to the at least one mixer by a number of links smaller than the number of correspondingly transmitted tones.

Advantageously, for example, space requirements can be efficiently be minimized.

According to a further implementation form of the first aspect of the present disclosure, the system further comprises a system output comprising the mixer output of at least a part, especially each, of the corresponding ones of the at least one mixer.

Advantageously, for instance, the system output can comprise or provide multiple output signals, especially multiple parallel output signals, or a single output signal, especially a single output signal combining the mixer outputs of at least a part, especially each, of the corresponding ones of the at least one mixer.

According to a further implementation form of the first aspect of the present disclosure, the multitone source comprises or is a frequency comb, a series of phase-locked loops which outputs are especially combined with the aid of a combiner, a digital-to-analog converter, a mixer fed from a local oscillator and a baseband signal, an optical down conversion, or any combination thereof.

Advantageously, for example, the multitone source can be configured to output at least two carrier signals at different frequencies.

According to a further implementation form of the first aspect of the present disclosure, the reference frequency source is an input or an internal element of the baseband signal generator or an internal or an external element of the multitone source. In addition to this or as an alternative, the reference frequency source for the baseband signal generator is the multitone source output.

Advantageously, for instance, especially in the case that the reference frequency source is an internal element of the baseband signal generator, additional hardware can be omitted, thereby reducing the required space.

According to a further implementation form of the first aspect of the present disclosure, the multitone source comprises at least one setting input. Additionally or alternatively, the at least one multitone source output comprises or is one multitone source output. In addition to this or as an alternative, the baseband signal generator comprises at least one control input. In further addition to this or as a further alternative, the at least one mixer forms a frequency converting module especially comprising at least one user setting input.

Advantageously, for example, especially in the case that the multitone source comprises at least one setting input, the corresponding spectrum of the multitone source, preferably the corresponding carrier frequencies, can be set by a user.

According to a further implementation form of the first aspect of the present disclosure, the system further comprises at least one filter for filtering at least one of the first mixer input, the second mixer input, the mixer output, or any combination thereof.

Advantageously, for instance, the modulated RF signals generating system can be adapted to the corresponding needs in an easy and efficient manner, which can analogously apply for the following implementation form.

According to a further implementation form of the first aspect of the present disclosure, the at least one filter comprises or is a high-pass filter or a low-pass filter or a bandpass filter, or any combination thereof.

According to a further implementation form of the first aspect of the present disclosure, the mixer output of at least a part, especially each, of the corresponding ones of the at least one mixer is connectable to a quantum computing architecture, especially a quantum computing architecture comprising at least one quantum bit, or a multiple-input multiple-output architecture preferably in a wired or wireless manner.

Advantageously, for instance, especially in the case of a wired connection, said wired connection may comprise at least one of a cable connection, a waveguide connection, a coaxial connection, or any combination thereof.

According to a further implementation form of the first aspect of the present disclosure, the system comprises at least one amplifier for amplifying at least a part or each of the mixer inputs from the baseband signal generator and/or the multitone source, at least a part or each of the mixer signal outputs, or any combinations thereof.

Advantageously, for example, the modulated RF signals generating system can be adapted to the corresponding needs in an easy and efficient manner.

According to a further implementation form of the first aspect of the present disclosure, the system comprises a combiner for combining the mixer output of at least a part, especially each, of the corresponding ones of the at least one mixer, preferably at least two mixers, to a single signal.

Advantageously, for instance, such a single signal requires just one connection, exemplarily just one cable.

According to a further implementation form of the first aspect of the present disclosure, the at least one mixer comprises or is at least one IQ mixer. In this context, at least one or each of the at least one IQ mixer especially comprises a first mixer input, second mixer input, a third mixer input, and a mixer output.

Advantageously, the corresponding one of the at least one baseband signal generator output can be connected to the first mixer input of the respective one of the at least one IQ mixer, the corresponding one of the at least one baseband signal generator output can be connected to the second mixer input of the respective one of the at least one IQ mixer, and the corresponding one of the at least one multitone source output, especially the multitone source output, can be connected to the third mixer input of the respective one of the at least one IQ mixer, especially to the third mixer input of each of the at least one IQ mixer.

According to a second aspect of the present disclosure, a system is provided. Said system comprises a modulated RF signals generating system according to the first aspect of the present disclosure or any of its implementation forms, respectively, and a multiple-state system especially comprising or being a quantum computing architecture or a multiple-input multiple-output architecture. In this context, in the case that the multiple-state system comprises or is a quantum computing architecture, the modulated RF signals generating system is used to control at least a part, especially each, of the multiple states of the multiple-state system or to read out at least a part, especially each, of the correspondingly stored information of the multiple-state system. As an alternative, in the case that the multiple-state system comprises or is a multiple-input multiple-output architecture, the modulated RF signals generating system is used to control or read out at least a part, especially each, of the multiple states of the multiple-state system.

Advantageously, the number of required local oscillator source is significantly reduced, thereby not only saving costs but also increasing phase stability between corresponding radio frequency channels.

Further advantageously, less power consumption can be achieved especially due to the reduced number of local oscillator sources.

According to an implementation form of the second aspect of the present disclosure, the multiple-state system comprises or is a quantum computing architecture, especially a quantum computing architecture comprising at least one quantum bit, or a multiple-input multiple-output architecture, especially a multiple-input multiple-output architecture comprising at least one antenna array.

Advantageously, for instance, a particularly efficient controlling or reading-out of a quantum computing architecture or a multiple-input multiple-output architecture, respectively, can be achieved.

According to an implementation form of the second aspect of the present disclosure, the at least one mixer is operated at a lower temperature, preferably within a dilution refrigerator or any other type of cryostat, as the ambient temperature.

According to an implementation form of the second aspect of the present disclosure, the baseband signal generator is operated at a lower temperature, preferably within a dilution refrigerator or any other type of cryostat, as the ambient temperature.

According to an implementation form of the second aspect of the present disclosure, the multitone source is fed to the at least one mixer by a number of links smaller than the number of correspondingly transmitted tones.

Advantageously, for instance, simpler cabling in the cryostat and low cost of cabling in the cryostat can efficiently be achieved. Further advantageously, not only low space requirement of cabling in the cryostat but also low heat load in the cryostat can be ensured. Accordingly, a particularly high scalability of cabling in the cryostat can be accomplished.

According to a third aspect of the present disclosure, a method for generating modulated RF signals for controlling or reading-out a multiple-state system, preferably a quantum computing architecture or a multiple-input multiple-output architecture, is provided. Said modulated RF signals generating method comprises the steps of providing at least one baseband signal preferably with the aid of a baseband signal generator, providing a reference frequency signal preferably with the aid of a reference frequency source being in unidirectional or bidirectional communication with the baseband signal generator, providing at least one multitone signal, especially a multitone signal, preferably with the aid of a multitone source being in unidirectional or bidirectional communication with the reference frequency source, locking the corresponding phase between the at least one baseband signal and the at least one multitone signal, especially the multitone signal, preferably with the aid of the reference frequency signal, and mixing the corresponding one of the at least one baseband signal with the respective one of the at least one multitone signal, especially the multitone signal, to form at least one mixer output signal preferably with the aid of at least one mixer.

With respect to the above-mentioned multitone source, it is noted that said multitone source may especially be configured to synthesize at least two different frequencies simultaneously.

With respect to the above-mentioned at least one mixer, it is noted that it might be particularly advantageous if the at least one mixer comprises or is at least one IQ mixer.

Advantageously, the number of required local oscillator source is significantly reduced, thereby not only saving costs but also increasing phase stability between corresponding radio frequency channels.

Further advantageously, less power consumption can be achieved especially due to the reduced number of local oscillator sources.

Before implementation forms of the third aspect of the present disclosure are discussed in the following, it is noted that corresponding advantages as explained within the scope of the first aspect or the second aspect of the present disclosure, respectively, analogously apply for said implementation form of the third aspect.

According to an implementation form of the third aspect of the present disclosure, the modulated RF signals generating method further comprises the step of forming at least one control or read-out signal on the basis of at least a part, especially each, of the at least one mixer output signal.

According to a further implementation form of the third aspect of the present disclosure, the multitone signal is generated with the aid of a frequency comb, a series of phase-locked loops which outputs are especially combined with the aid of a combiner, a digital-to-analog converter, a mixer fed from a local oscillator and a baseband signal, an optical down conversion, or any combination thereof.

According to a further implementation form of the third aspect of the present disclosure, at least a part or each of the at least one multitone signal, especially the multitone signal, comprises at least two tones. Additionally or alternatively, at least a part or each of the at least one multitone signal, especially the multitone signal, is generated on the basis of at least one setting input. Further additionally or further alternatively, at least a part or each of the at least one baseband signal is generated on the basis of at least one control input.

According to a further implementation form of the third aspect of the present disclosure, the modulated RF signals generating method further comprises the step of filtering at least a part or each of the at least one baseband signal, at least a part or each of the at least one multitone signal, especially the multitone signal, at least a part or each of the at least one mixer output signal, or any combination thereof preferably with the aid of at least one filter.

The above description with regard to the system according to the first and second aspects of the disclosure is correspondingly valid for the method according to the third aspect of the disclosure, and vice versa. In addition to this, the above description with regard to the system according to the first aspect of the disclosure is correspondingly valid for the system according to the second aspect of the disclosure, and vice versa.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTIONS OF EMBODIMENTS

Figure 1:
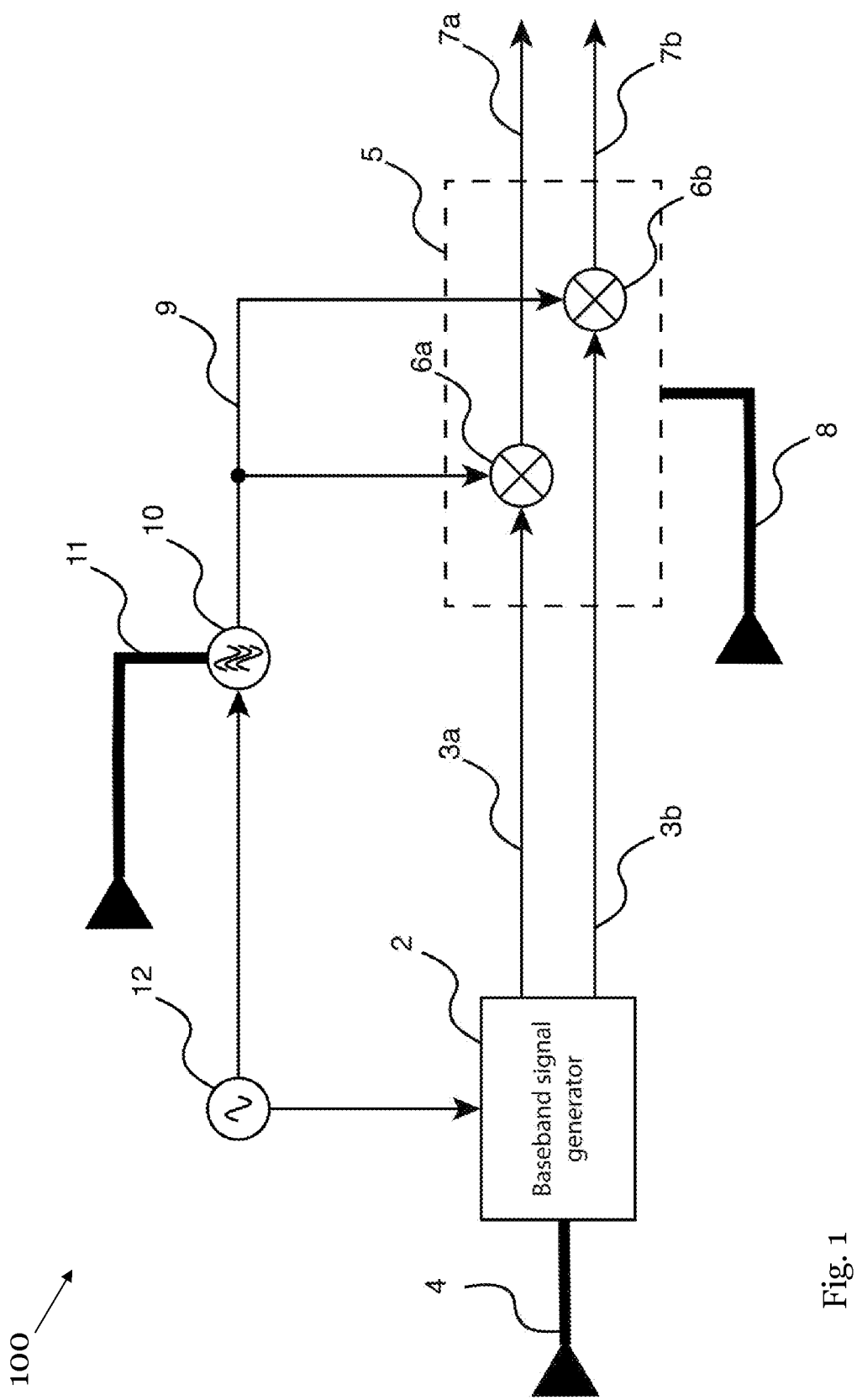
FIG. 1 shows a schematic diagram of a modulated RF signals generating system for controlling or reading-out a multiple-state system according to the first aspect of the present disclosure.

FIG. 1 shows a schematic diagram of a system 100 for generating a multitude of modulated RF signals for controlling or reading-out a multiple-state system according to the first aspect of the present disclosure.

As it can be seen from FIG. 1, said modulated RF signals generating system 100 comprises a baseband signal generator 2 comprising at least one baseband signal generator output, exemplarily two based signal generator outputs 3a, 3b, a reference frequency source 12 being in unidirectional or bidirectional, exemplarily unidirectional, communication with the baseband signal generator 2, a multitone source 10 comprising at least one multitone source output, exemplarily one multitone source output 9, and being in unidirectional or bidirectional, exemplarily unidirectional, communication with the reference frequency source 12 to lock the corresponding phase between the baseband signal generator 2 and the multitone source 10, and at least one mixer, exemplarily two mixers 6a, 6b, each of which comprising a first mixer input, a second mixer input and a mixer output.

In this context, the corresponding one of the at least one baseband signal generator output, exemplarily the two baseband signal generator outputs 3a, 3b, is connected to the first mixer input of the respective one of the at least one mixer, exemplarily the two mixers 6a, 6b.

In addition to this, the corresponding one of the at least one multitone source output, exemplarily the multitone source output, is connected to the second mixer input of the respective one of the at least one mixer, exemplarily the two mixers 6a, 6b, especially to the second mixer input of each of the at least one mixer, exemplarily the two mixers 6a, 6b.

It is noted that it might be particularly advantageous if the number of baseband signal generator outputs is equal to the number of mixers. In this context, an n-th baseband signal generator output may especially be connected to an input or a first input, respectively, of an n-th mixer.

It is further noted that it might be particularly advantageous if the multitone source 10 comprises a single multitone source output, such as the multitone source output 9. In this context, said single multitone source output may especially be connected to each of the mixers, such as the mixers 6a, 6b, especially a further input or a second input, respectively, of each of the mixers.

To illustrate this even more concretely, in this exemplary case of FIG. 1, it is noted that the baseband signal generator 2 comprises a first baseband signal generator output 3a connected to an input or a first input, respectively, of the first mixer 6a, wherein a further input or a second input, respectively, of the first mixer 6a is connected to the multitone source output 9 or the single multitone source output, respectively, of the multitone source 10.

In addition to this, the baseband signal generator 2 comprises a second baseband signal generator output 3b connected to an input or a first input, respectively, of the second mixer 6b, wherein a further input or a second input, respectively, of the second mixer 6b is connected to the multitone source output 9 or the single multitone source output, respectively, of the multitone source 10.

In further addition to this, the first mixer 6a comprises the mixer output 7a, whereas the second mixer 6b comprises the mixer output 7b.

Moreover, it might be particular advantageous if the modulated RF signals generating system 100 further comprises a modulated RF signals generating system output comprising the mixer output of at least a part, especially each, of the corresponding ones of the at least one mixer.

Accordingly, in this exemplary case as shown in FIG. 1, said modulated RF signals generating system output comprises at least one, preferably each, of the mixer output 7a and the mixer output 7b.

With respect to the multitone source 10, it is noted that it might be particularly advantageous if the multitone source 10 comprises or is a frequency comb, a series of phase-locked loops which outputs are especially combined with the aid of a combiner, a digital-to-analog converter, a mixer fed from a local oscillator and a baseband signal, an optical down conversion, or any combination thereof.

In addition to this or as an alternative, the multitone source 10 may comprise or be a multitone local oscillator source or a multicolor source, preferably a multicolor local oscillator source.

Furthermore, with respect to the reference frequency source 12, it is noted that it might be particularly advantageous if the reference frequency source 12 is an input or an internal element of the baseband signal generator 2.

Again, with respect to the multitone source 10, it might be particularly advantageous if the multitone source 10 is configured to output at least two tones. Additionally or alternatively, the multitone source 10 may comprise at least one setting input such as the setting input 11. In further addition to this or as a further alternative, the baseband signal generator 2 may comprise at least one control input such as the control input 4. Further additionally or further alternatively, the at least one mixer, exemplarily the two mixers 6a, 6b, forms or form, respectively, a frequency converting module 5 especially comprising at least one user setting input such as the user setting input 8.

With respect to the at least one setting input or the setting input 11, respectively, it is noted that said at least one setting input or said setting input 11, respectively, may be configured to receive at least one user setting.

With respect to the at least one control input or the control input 4, respectively, it is noted that the at least one control input or the control input 4, respectively, may comprise or be a user interface. In this context, it might be particularly advantageous if the respective output signal of the at least one baseband signal generator output, exemplarily the respective output signals of the two baseband signal generator outputs 3a, 3b, of the baseband signal generator 2 is or are, respectively, defined via the at least one control input or the control input 4, respectively, especially via said user interface, preferably by a user.

With respect to the above-mentioned at least one user setting input or the above-mentioned user setting input 8, respectively, it is noted that said at least one user setting input or said user setting input 8, respectively, may be configured to receive at least one further user setting.

Especially in the light of the above-mentioned at least one control input or the above-mentioned control input 4, respectively, of the baseband signal generator 2 and the above-mentioned at least one setting input or the above-mentioned setting input 11, respectively, of the multitone source 10, it is noted that it might be particularly advantageous if the modulated RF signals generating system 100 comprises a modulated RF signals generating system input comprising or being the above-mentioned at least one control input or the above-mentioned control input 4, respectively, of the baseband signal generator 2 and the above-mentioned at least one setting input or the above-mentioned setting input 11, respectively, of the multitone source 10.

Furthermore, it might be particularly advantageous if the frequency converting module 5 is configured by the above-mentioned at least one further user setting via the above-mentioned user setting input 8, respectively.

It is further noted that it might be particularly advantageous if the modulated RF signals generating system 100 further comprises at least one filter for filtering at least one of the first mixer input, the second mixer input, the mixer output, or any combination thereof.

Accordingly, the first baseband signal generator output 3a may be connected to the first mixer input of the first mixer 6a via a filter. Additionally or alternatively, the multitone source output 9 may be connected to the second mixer input of the first mixer 6a via a filter. Further additionally or further alternatively, the mixer output 7a of the first mixer 6a may be connected to an interface of the multiple-state system via a filter.

By analogy therewith, the second baseband signal generator output 3b may be connected to the first mixer input of the second mixer 6b via a filter. Additionally or alternatively, the multitone source output 9 may be connected to the second mixer input of the second mixer 6b via a filter. Further additionally or further alternatively, the mixer output 7b of the second mixer 6b may be connected to an interface, especially the above-mentioned interface, of the multiple-state system via a filter.

With respect to the above-mentioned at least one filter, it is noted that it might be particularly advantageous if the at least one filter comprises or is a high-pass filter or a low-pass filter or a bandpass filter. Accordingly, this may analogously apply for each of the above-mentioned filters.

Moreover, it might be particularly advantageous if the mixer output of at least a part, especially each, of the corresponding ones of the at least one mixer, exemplarily the mixers 6a, 6b, is connectable to a quantum computing architecture, especially a quantum computing architecture comprising at least one quantum bit, or a multiple-input multiple-output architecture preferably in a wired or wireless manner.

Accordingly, it might be particularly advantageous if at least one, especially each, respective mixer output 7a, 7b of the two mixers 6a, 6b is connectable to a quantum computing architecture, especially a quantum computing architecture comprising at least one quantum bit, or a multiple-input multiple-output architecture preferably in a wired or wireless manner.

With respect to the wired manner, it is noted that said wired manner may comprise the usage of at least one of a cable connection, a waveguide connection, a coaxial connection, or any combination thereof.

With respect to the wireless manner, it is noted that said wireless manner may comprise the usage of at least one antenna or antenna array.

Furthermore, it might be particularly advantageous if the modulated RF signals generating system 100 comprises at least one amplifier for amplifying at least a part or each of the mixer inputs from the baseband signal generator 2 and/or the multitone source 10, at least a part or each of the mixer signal outputs, or any combinations thereof.

Accordingly, at least one or each of the at least one multitone source output, preferably the multitone source output 9 or the single multitone source output, respectively, may be connected to at least one or each of the respective second mixer inputs of the at least one mixer, exemplarily to each of the respective second mixer inputs of the two mixers 6a, 6b, via a corresponding amplifier.

Accordingly, at least one or each of the at least one baseband signal generator output, exemplarily the baseband signal generator outputs 3a, 3b, may be connected to the respective first mixer inputs of the at least one mixer, exemplarily the respective first mixer inputs of the two mixers 6a, 6b, via a corresponding further amplifier.

It is further noted that it might be particularly advantageous if the modulated RF signals generating system 100 comprises a combiner for combining the mixer output of at least a part, especially each, of the corresponding ones of the at least one mixer, exemplarily the two mixers 6a, 6b, to a single signal.

Accordingly, the mixer outputs 7a and 7b of the mixers 6a and 6b may be combined with the aid of a combiner in a manner that a single signal, especially a single system output signal, is formed. Advantageously, especially in the case of a wired connection between the system 100 and the multiple-state system, only one cable or waveguide, respectively, is needed.

Again, with respect to the above-mentioned frequency converting module 5, it is noted that it might be particularly advantageous if said frequency converting module 5 comprises such a combiner.

It is further noted that said frequency converting module 5 may generally comprise at least one baseband signal input for connecting the baseband signal generator 2, at least one local oscillator signal input, preferably one local oscillator signal input, for connecting the multitone source 10, and at least one signal output being connectable to the multiple-state system.

In this context, it might be particularly advantageous if the number of baseband signal inputs is equal to the number of signal outputs. Furthermore, the frequency converting module 5 may comprise at least one mixer, wherein the number of mixers is preferably equal to the number of baseband signal inputs or the number of signal outputs, respectively.

Accordingly, in this exemplary case of FIG. 1, the frequency converting module 5 comprises two baseband signal input for connecting the baseband signal generator 2 or the baseband signal generator outputs 3a, 3b, respectively, one local oscillator signal input for connecting the multitone source 10 or the multitone source output 9, respectively, and two signal outputs 7a, 7b being connectable to the multiple-state system.

It is noted that it might be particularly advantageous if the frequency converting module 5 is operated at a lower temperature, preferably within a dilution refrigerator or any other type of cryostat, as the ambient temperature.

It is further noted that it might be particularly advantageous if the multitone source 10 is fed to the frequency converting module 5 by a number of links smaller than the number of correspondingly transmitted tones.

Figure 2:
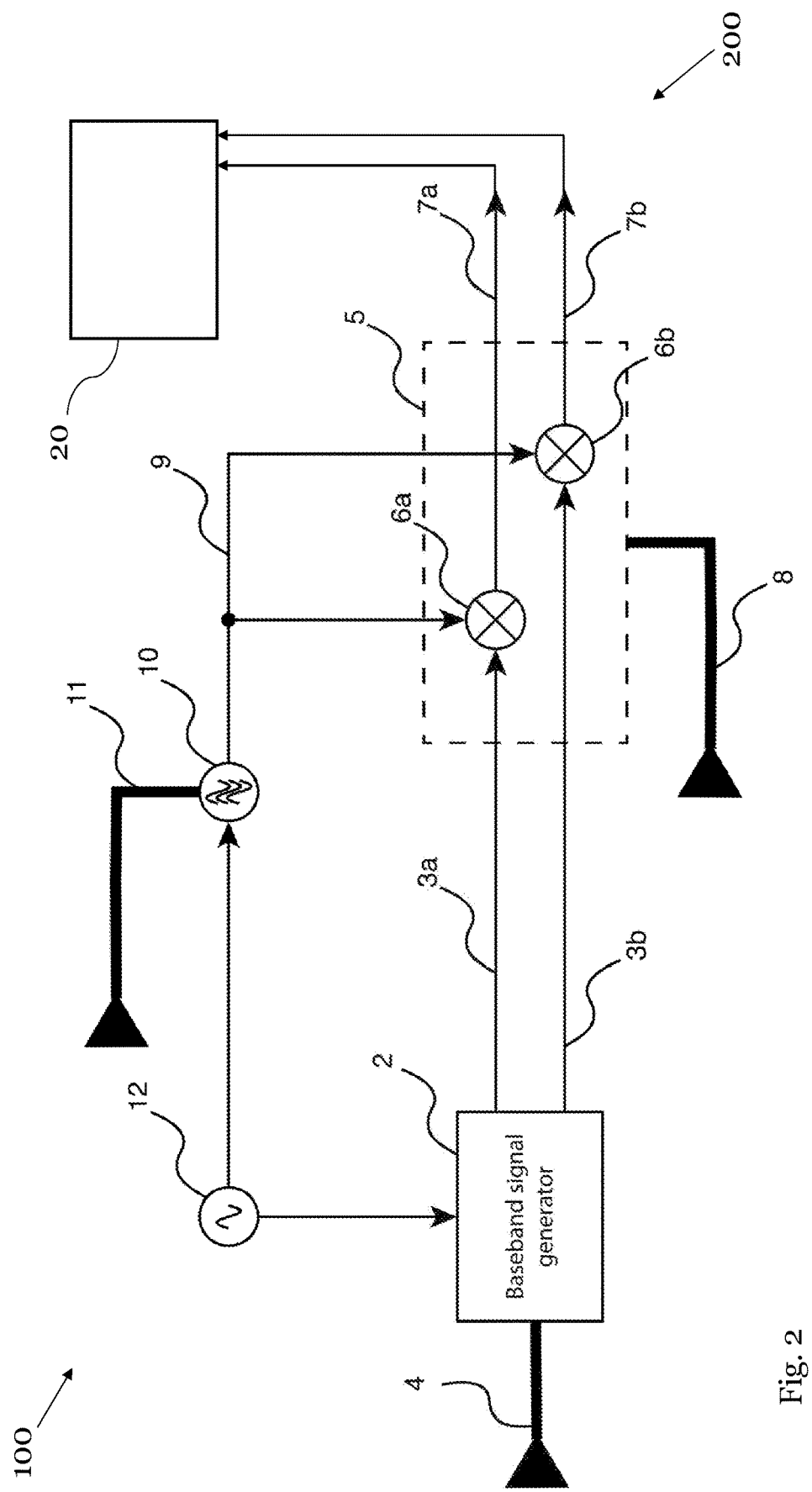
FIG. 2 shows a schematic diagram of a system according to the second aspect of the present disclosure.

Now, with respect to FIG. 2, a schematic diagram of a system 200 according to the second aspect of the present disclosure is illustrated.

Said system 200 comprises a modulated RF signals generating system 100 as explained above in the context of FIG. 1, and a multiple-state system 20, preferably a quantum computing architecture or a multiple-input multiple-output architecture. In this context, the modulated RF signals generating system 100 is used to control or read out at least a part, especially each, of the multiple states of the multiple-state system 20.

Figure 3:
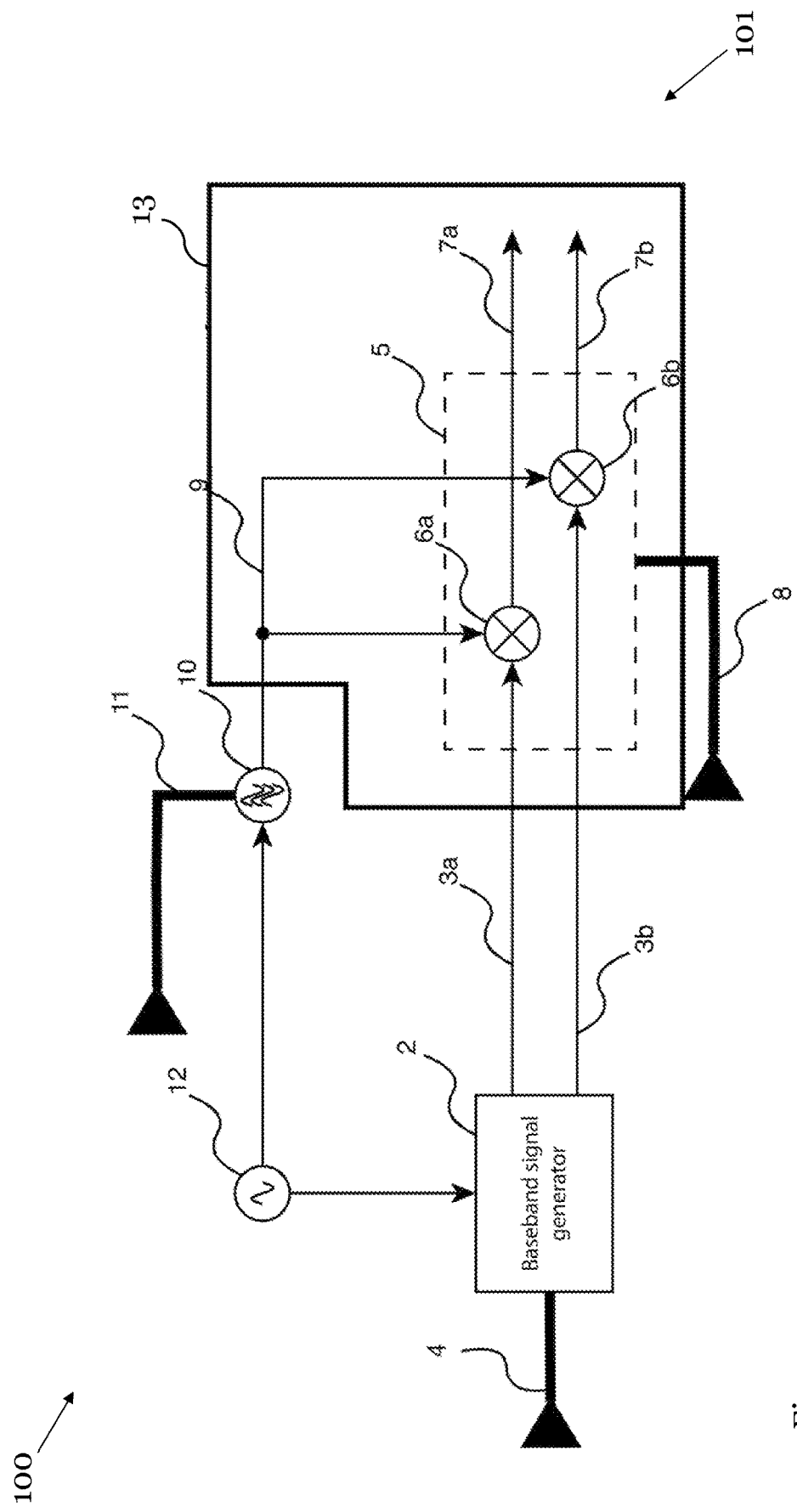
FIG. 3 shows a first exemplary embodiment of the system of FIG. 1 in combination with a cryostat.
Figure 4:
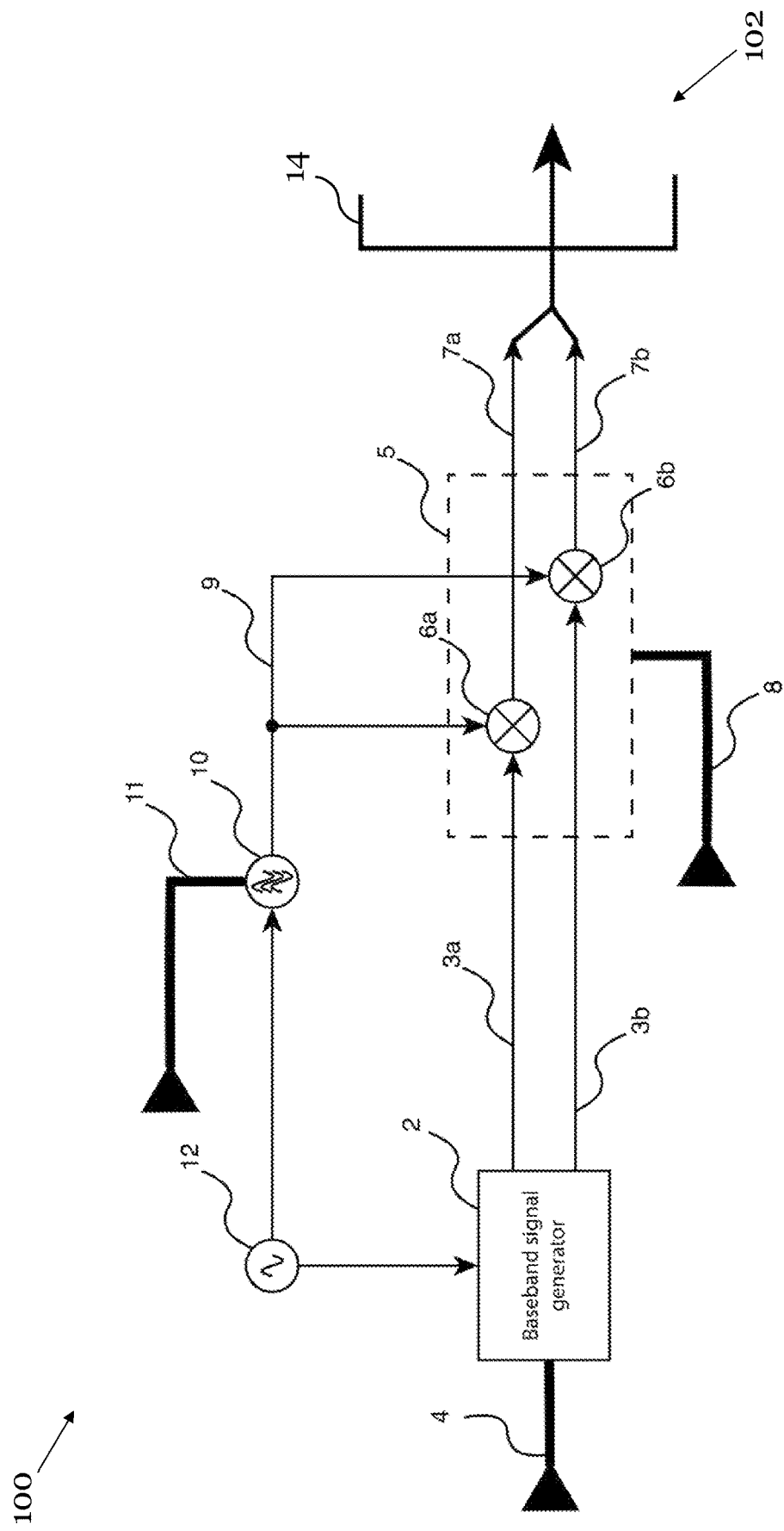
FIG. 4 shows a second exemplary embodiment of the system of FIG. 1 in combination with a cryostat.
Figure 5:
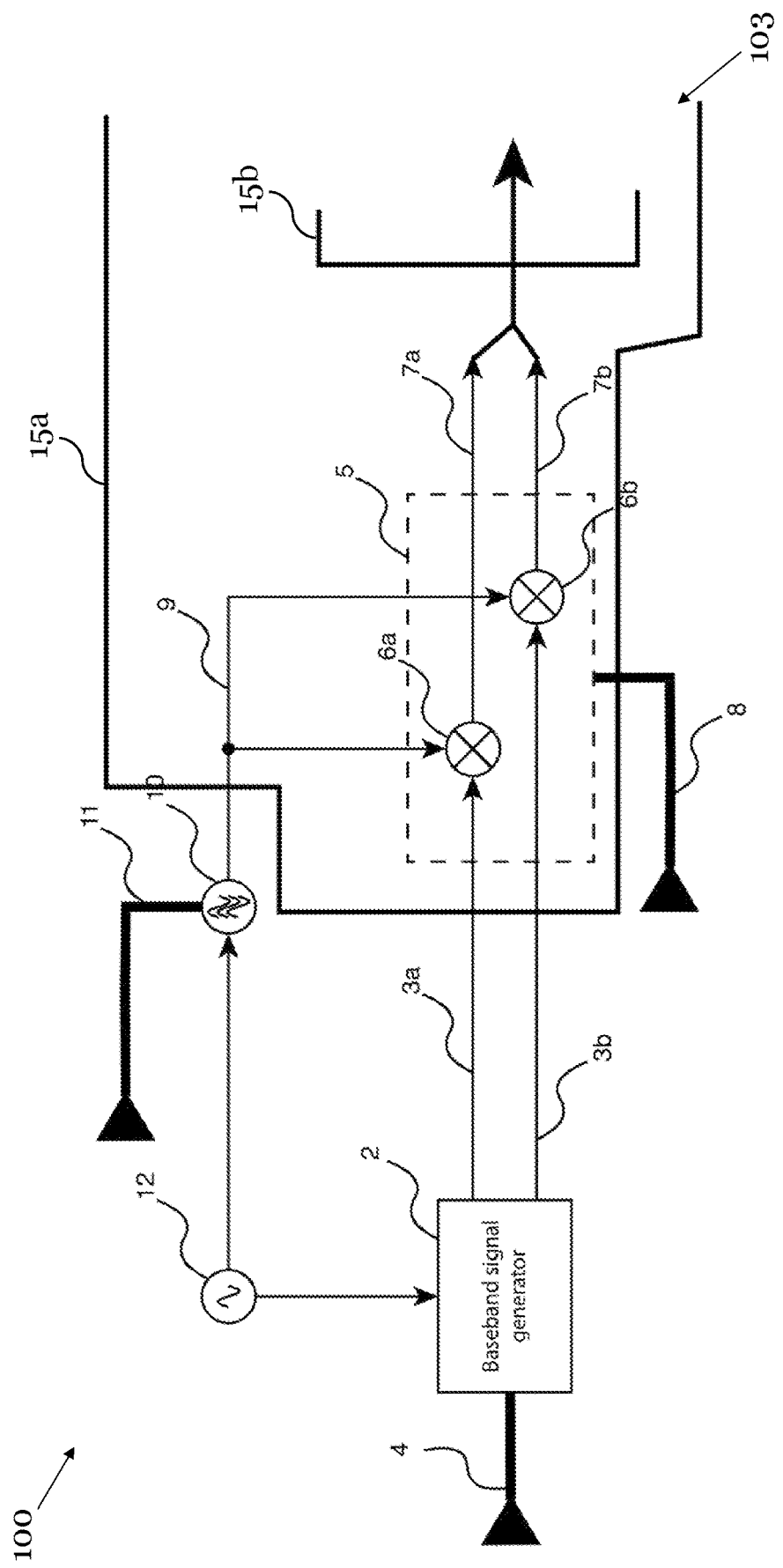
FIG. 5 shows a third exemplary embodiment of the system of FIG. 1 in combination with a cryostat.

Furthermore, FIG. 3, FIG. 4, and FIG. 5 illustrate exemplary embodiments of the system according to FIG. 1 in combination with a cryostat 13. For the sake of brevity, it is noted that identical elements of said FIG. 3, FIG. 4, and FIG.

5 in comparison with FIG. 1 are equipped with the same reference signs as in FIG. 1, thereby clarifying that the corresponding explanations above can analogously apply without repeating such explanations. For the sake of completeness, it is further noted that this can analogously apply for FIG. 2 in comparison with FIG. 1.

In accordance with the first exemplary embodiment 101 of FIG. 3, at least a part of the modulated RF signals generating system 100 is located within a cryostat 13. It is noted that the modulated RF signals generating system 100 can comprise said cryostat 13.

As it can be seen, in this exemplary case according to FIG. 3, the at least one mixer, exemplarily the two mixers 6a, 6b, are located within the cryostat 13. In other words, the cryostat 13 comprises the at least one mixer, exemplarily the two mixers 6a, 6b.

In addition to this, the cryostat 13 can comprises the frequency converting module 5. Furthermore, the cryostat 13 can comprises at least one of at least a part of the corresponding signal path to the respective first mixer input, at least a part of the corresponding signal path to the respective second mixer input, at least a part of the corresponding signal path from the respective mixer output, or any combination thereof.

In accordance with the second exemplary embodiment 102 of FIG. 4, at least a part of the modulated RF signals generating system 100 is located within a cryostat 14. It is noted that the modulated RF signals generating system 100 can comprise said cryostat 14.

In this exemplary case of FIG. 4, the combined signal of the mixer outputs 7a, 7b is located within the cryostat. Accordingly, the modulated RF signals generating system 100 may especially comprise a combiner for combining the mixer outputs 7a, 7b to a single signal or said combined signal, respectively.

Now, with respect to the third exemplary embodiment 103 according to FIG. 5, a first part of the modulated RF signals generating system 100 is located within a first stage 15a, especially a 4K stage, of a cryostat, wherein a second part of the modulated RF signals generating system 100 is located within a second stage 15b, especially an mK stage, of the cryostat.

As it can be seen, in this exemplary case according to FIG. 5, the at least one mixer, exemplarily the two mixers 6a, 6b, are located within first stage 15a of the cryostat. In other words, the cryostat comprises the first stage 15a and the second stage 15b, wherein the first stage 15a comprises the at least one mixer, exemplarily the two mixers 6a, 6b.

In addition to this, the first stage 15a of the cryostat can comprises the frequency converting module 5. Furthermore, the first stage 15a of the cryostat can comprises at least one of at least a part of the corresponding signal path to the respective first mixer input, at least a part of the corresponding signal path to the respective second mixer input, at least a part of the corresponding signal path from the respective mixer output, or any combination thereof.

Moreover, the combined signal of the mixer outputs 7a, 7b is located within the second stage 15b of the cryostat. Accordingly, the modulated RF signals generating system 100 may especially comprise a combiner for combining the mixer outputs 7a, 7b to a single signal or said combined signal, respectively. It is noted that the first stage 15a of the cryostat can comprises such a combiner.

With respect to each of the exemplary embodiments 101, 102, 103 of FIG. 3, FIG. 4, FIG. 5, it is noted that corresponding major advantages can be summarized as simpler cabling in the cryostat, low cost of cabling in the cryostat, low space requirement of cabling in the cryostat, and low heat load in the cryostat, thereby achieving a particularly high scalability of cabling in the cryostat.

It is noted that in the following, it is assumed that the multiple-state system 20 is a quantum computing architecture as mentioned in the context of the explanations regarding FIG. 2 above, especially a quantum computing architecture comprising at least one quantum bit. Furthermore, the multiple-state system 20 can also be a quantum computer.

Especially in the context of solving complex problems, such a quantum computing architecture or a quantum computer, respectively, exploits natural quantum properties. In this regard, logic states are represented and processed using quantum bits. Such a quantum bit can simultaneously exist in combinations of two states.

This phenomenon is known as superposition and cannot be explained using the laws of classical physics.

With respect to the quantum computing architecture 20 or the quantum computer, respectively, it is noted that it might be particularly advantageous if said quantum computing architecture 20 or said quantum computer, respectively, is configured to implement the at least one quantum bit as at least one superconducting quantum bit, spin quantum bit, trapped-ion quantum bit, or Nitrogen-Vacancy (NV) center quantum bit.

Said at least one superconducting quantum bit may preferably be adapted to use at least one electrical circuit to store electromagnetic fields.

Moreover, it might be particularly advantageous if the quantum computing architecture 20 or the quantum computer, respectively, comprises at least one resonant circuit configured to produce a controllable two-state system especially representing the at least one quantum bit.

With respect to the at least one resonant circuit, it is noted that it might be particularly advantageous if the corresponding resonance frequency is between 1 GHz and 110 GHz, preferably between 1.8 GHz and 50 GHz, more preferably between 2 GHz and 8 GHz, most preferably between 3 GHz and 7 GHz.

Preferably, the frequency range of the signal at the at least one mixer output includes at least one resonance frequency of the at least one quantum bit. For instance, for superconducting quantum bits, the frequency range is preferably between 2 GHz and 8 GHz, and/or for spin quantum bits between 2 GHz and 50 GHz.

Preferably, the corresponding base state of the at least one resonant circuit is defined to be logic state "zero" and the corresponding first excited state is defined to be logic state "one".

Furthermore, the corresponding energy state of the at least one quantum bit can be controlled with the aid of the modulated RF signals generating system output or the mixer outputs 7a, 7b, respectively, especially with the aid of the corresponding output signals thereof.

Figure 6:
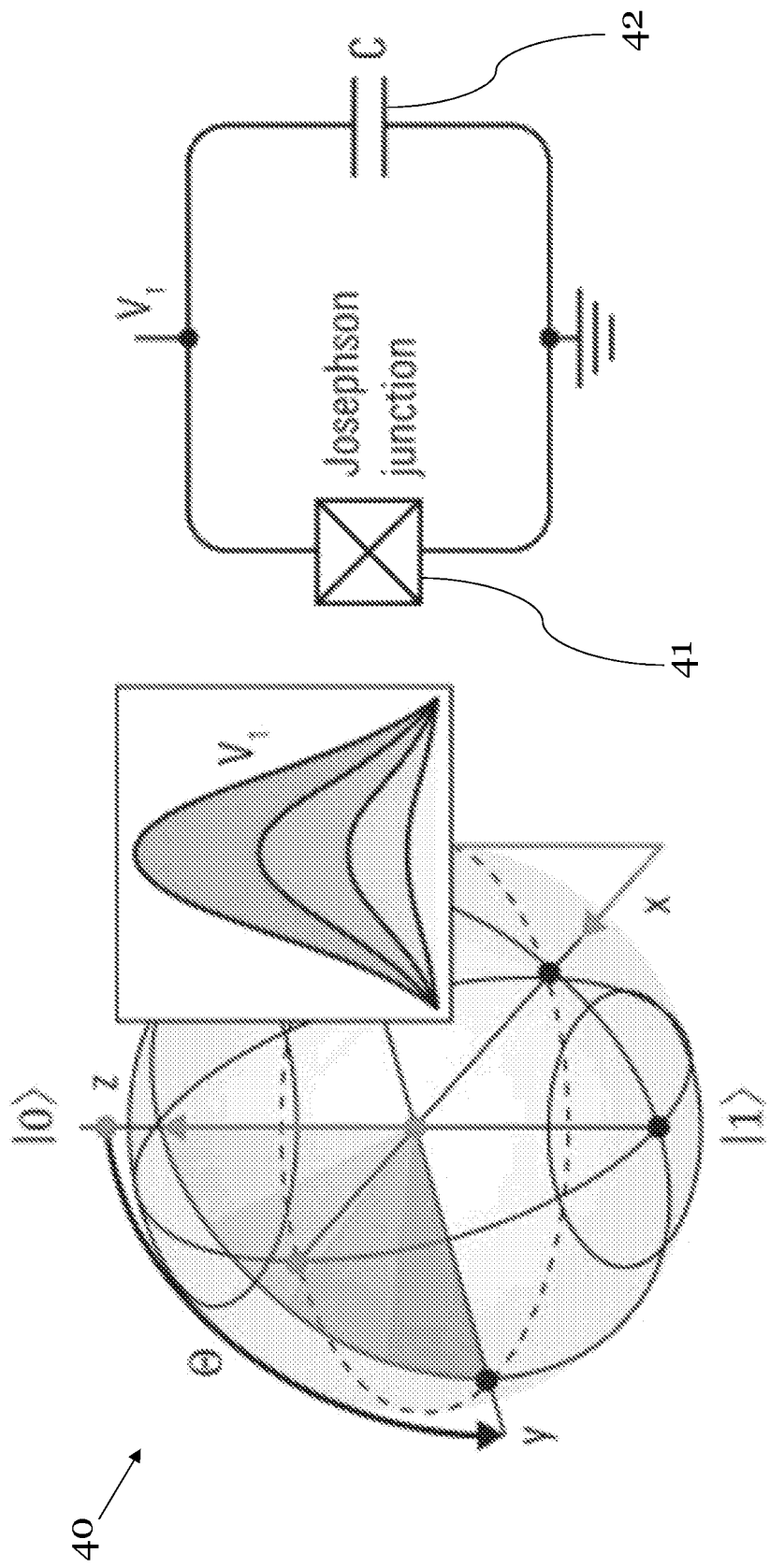
FIG. 6 shows an illustration of a quantum bit with the aid of a Bloch sphere.

For further illustration, in accordance with FIG. 6, a Bloch sphere 40 visualizes this process. As it can be seen, the "one" and "zero" logic states are located at the north and south poles of the Bloch sphere 40. Every other point on the surface of the Bloch sphere 40 corresponds to a superposition state. The current state is indicated by a state vector. Interaction with a resonant microwave signal, especially output by the modulated RF signals generating system output or the mixer outputs 7a, 7b, respectively, causes rotation of the state vector in the Bloch sphere 40.

Especially to perform dependable computing operations with quantum bits, this rotation needs to be controlled with great precision preferably based on the pulse length, microwave signal amplitude and the control pulse envelope. The corresponding relative phase of the control pulse influences the rotation axis of the quantum bit state in the Bloch sphere 40. When pulses with the same phase are applied to the quantum bit, the state always rotates on e.g. the x-axis. If a pulse is phase-shifted by 90 degrees, the state vector will rotate on the y-axis.

In accordance with FIG. 6, the corresponding state of the at least one quantum bit can be changed by a control signal $V_1$, especially represented as a rotation on the surface of the Bloch sphere 40.

Accordingly, the modulated RF signals generating system output or the mixer outputs 7a, 7b, respectively, may be configured to output a control signal applied to the at least one quantum bit such that the corresponding state of the at least one quantum bit is changed, thereby especially causing a rotation on the surface of the Bloch sphere 40.

As it can further be seen from FIG. 6, a Josephson junction 41 is configured to create two distinct energy states that can be used as a controllable quantum bit. Said Josephson junction 41 may be configured to give the transition from the base state to the first excited state a characteristic frequency that is unique to this transition.

Accordingly, the quantum computing architecture 20 or the quantum computer, respectively, may comprise at least one Josephson junction configured to implement the at least one quantum bit. In this context, the at least one Josephson junction may be configured to create two distinct energy states used as the at least one quantum bit.

As also depicted by FIG. 6, the above-mentioned control signal $V_1$ may especially be applied to a parallel connection of the Josephson junction 41 and a capacitance 42.

Accordingly, the above-mentioned control signal output by the modulated RF signals generating system output or the mixer outputs 7a, 7b, respectively, may be applied to the at least one Josephson junction, preferably to at least one parallel connection, each of which comprises a respective Josephson junction and a respective capacitance. In this context, the at least one Josephson junction or the at least one parallel connection, respectively, especially forms the at least one quantum bit.

Moreover, it might be particularly advantageous if the modulated RF signals generating system 100 is configured to regulate the corresponding control pulse phase in real time and/or to control the corresponding envelopes especially for reaching any desired target point on the Bloch sphere 40 at any time from any starting point.

Figure 7:
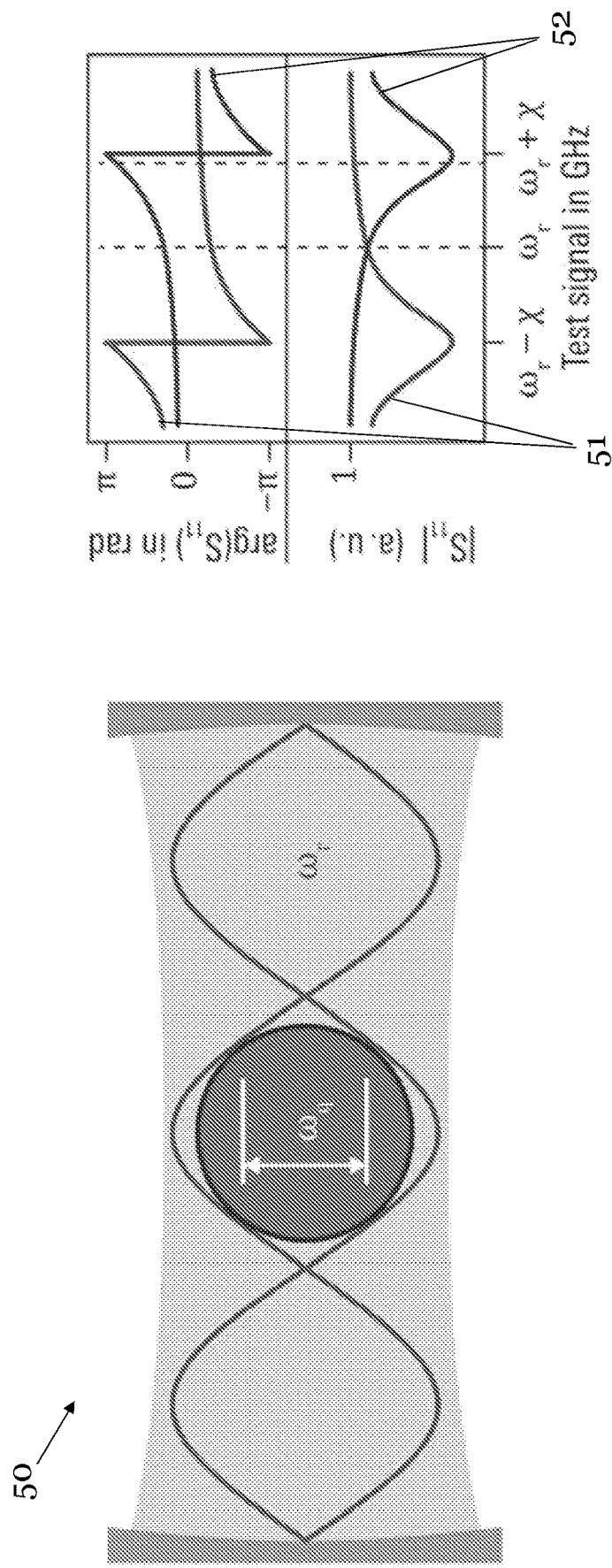
FIG. 7 shows an illustration of reading-out a quantum bit.

Now, with respect to FIG. 7, an illustration of reading-out a quantum bit is shown. In particular, FIG. 7 relates to a resonance shift, wherein the two corresponding systems mutually influence each other through interaction between the quantum bit and a resonator 50. Depending on the quantum bit state, exemplarily illustrated by the pairs 51, 52 of curves, the corresponding resonance frequency $\omega_r$ is shifted by a certain modulus $\chi$.

Once the quantum computing architecture 20 or the quantum computer, respectively, runs an operation, the quantum states of the quantum bits are selected and the quantum bits are coupled to read-out resonators. Due to interaction with the corresponding quantum bit, the resonance frequency of the respective resonator is shifted depending on the corresponding quantum bit state. By stimulating it with a read-out signal near the resonance frequency, it becomes possible to read out the quantum bit based on the shift in the signal's amplitude and phase in transmission or reflection.

Accordingly, the quantum computing architecture 20 or the quantum computer, respectively, and/or the modulated RF signals generating system 100 comprises at least one read-out resonator. In this context, it might be particularly advantageous if the quantum computing architecture 20 or the quantum computer, respectively, and/or the modulated RF signals generating system 100 are/is configured to couple the at least one quantum bit to the at least one read-out resonator especially if the quantum computing architecture 20 or the quantum computer, respectively, runs an operation. Furthermore, the quantum computing architecture 20 or the quantum computer, respectively, and/or the modulated RF signals generating system 100 may be configured to read out the at least one quantum bit based on a resonance frequency shift especially by correspondingly stimulating with a read-out signal near the resonance frequency.

Figure 8:
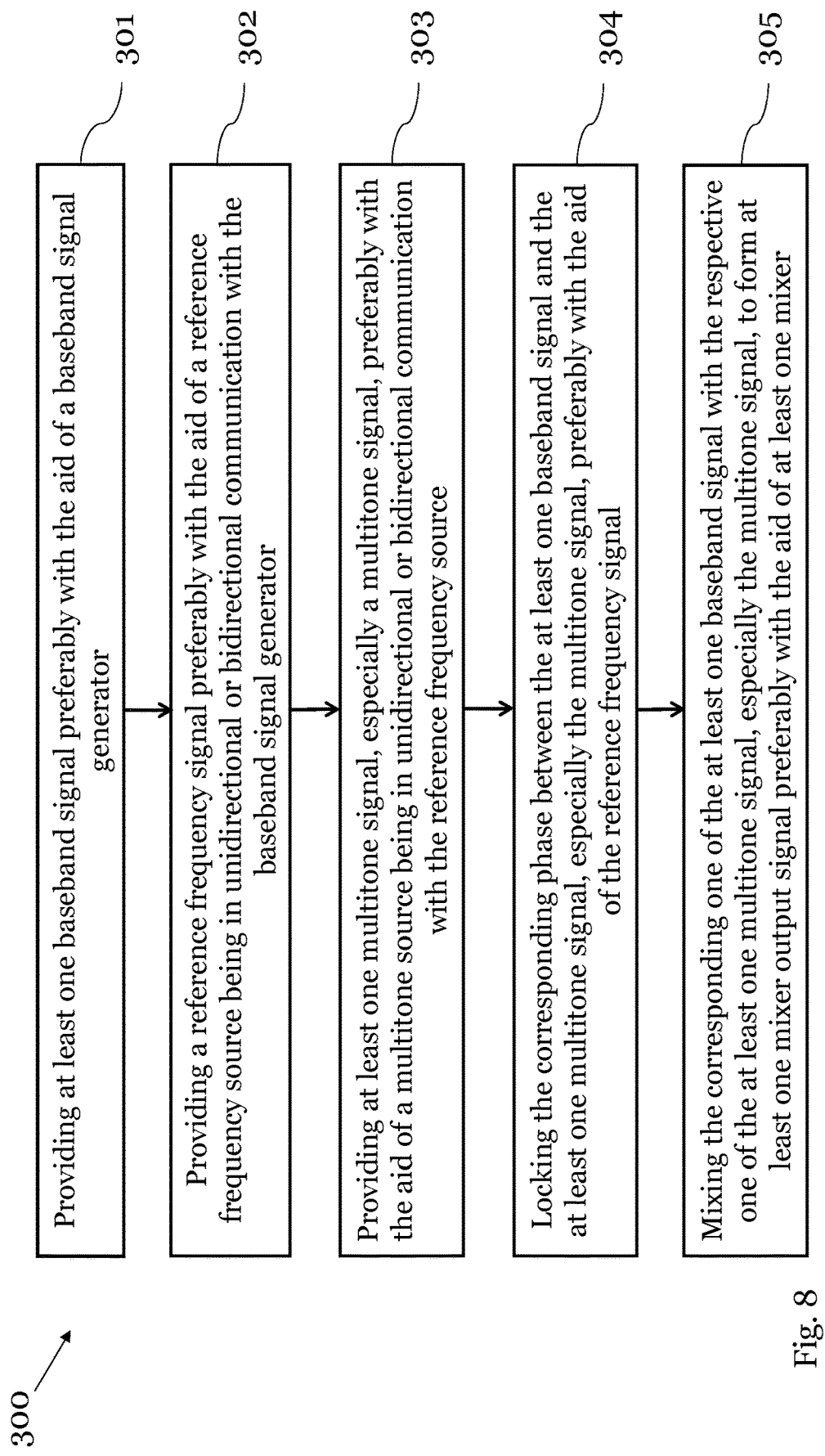
FIG. 8 shows a flow diagram of a method for generating modulated RF signals for controlling or reading-out a multiple-state system according to the third aspect of the present disclosure.

Finally, FIG. 8 depicts a flow diagram of a method 300 for generating modulated RF signals for controlling or reading-out a multiple-state system, preferably a quantum computing architecture such as the architecture 20 of FIG. 2 or a multiple-input multiple-output architecture, according to the third aspect of the present disclosure.

It is noted that it might be particularly advantageous if the modulated RF signals generating method 300 uses the modulated RF signals generating system 100 for controlling or reading-out a multiple-state system as shown in FIG. 1 or FIG. 2, respectively.

In accordance with FIG. 8, a first step 301 of the modulated RF signals generating method 300 comprises providing at least one baseband signal preferably with the aid of a baseband signal generator such as the baseband signal generator 2 of FIG. 1 or FIG. 2, respectively.

Furthermore, a second step 302 comprises providing a reference frequency signal preferably with the aid of a reference frequency source, such as the reference frequency source 12 of FIG. 1 or FIG. 2, respectively, being in unidirectional or bidirectional communication with the baseband signal generator.

Moreover, a third step 303 comprises providing at least one multitone signal, especially a multitone signal, preferably with the aid of a multitone source, such as the multitone source 10 of FIG. 1 or FIG. 2, respectively, being in unidirectional or bidirectional communication with the reference frequency source.

Additionally, a fourth step 304 comprises locking the corresponding phase between the at least one baseband signal and the at least one multitone signal, especially the multitone signal, preferably with the aid of the reference frequency signal.

In further addition to this, as it can be seen from FIG. 8, a fifth step 305 comprises mixing the corresponding one of the at least one baseband signal with the respective one of the at least one multitone signal, especially the multitone signal, to form at least one mixer output signal preferably with the aid of at least one mixer such as the mixer 6a, 6b of FIG. 1 or FIG. 2, respectively.

All features described above or features shown in the figures can be combined with each other in any advantageous manner within the scope of the disclosure.

What is claimed is:

1. A system for generating a multitude of modulated RF signals for controlling or reading-out a multiple-state system, such as a quantum computing architecture or a multiple-input multiple-output architecture, comprising:
    a baseband signal generator comprising at least one baseband signal generator output, a reference frequency source being in unidirectional or bidirectional communication with the baseband signal generator, a multitone source comprising at least one multitone source output and being in unidirectional or bidirectional communication with the reference frequency source to lock the corresponding phase between the baseband signal generator and the multitone source, and at least one mixer comprising a first mixer input, at least a second mixer input and a mixer output, wherein the corresponding one of the at least one baseband signal generator output is connected to the first mixer input of the respective one of the at least one mixer, wherein the corresponding one of the at least one multitone source output, especially the multitone source output, is connected to the second mixer input of the respective one of the at least one mixer, especially to the second mixer input of each of the at least one mixer.

2. The system according to claim 1,
wherein the multitone source is fed to the at least one mixer by a number of links smaller than the number of correspondingly transmitted tones.

3. The system according to claim 1,
wherein the system further comprises a modulated RF signals generating system output comprising the mixer output of at least a part, especially each, of the corresponding ones of the at least one mixer.

4. The system according to claim 1,
wherein the multitone source comprises or is a frequency comb, a series of phase-locked loops which outputs are especially combined with the aid of a combiner, a digital-to-analog converter, a mixer fed from a local oscillator and a baseband signal, an optical down conversion, or any combination thereof.

5. The system according to claim 1,
wherein the reference frequency source is an input or an internal element of the baseband signal generator or an internal or an external element of the multitone source, and/or wherein the reference frequency source for the baseband signal generator is the multitone source output.

6. The system according to claim 1,
wherein the multitone source comprises at least one setting input, and/or
wherein the at least one multitone source output comprises or is one multitone source output, and/or
wherein the baseband signal generator comprises at least one control input, and/or
wherein the at least one mixer forms a frequency converting module especially comprising at least one user setting input.

7. The system according to claim 1,
wherein the system further comprises at least one filter for filtering at least one of the first mixer input, the second mixer input, the mixer output, or any combination thereof.

8. The system according to claim 6,
wherein the at least one filter comprises or is a high-pass filter or a low-pass filter or a bandpass filter, or any combination thereof.

9. The system according to claim 1,
wherein the mixer output of at least a part, especially each, of the corresponding ones of the at least one mixer is connectable to a quantum computing architecture, especially a quantum computing architecture comprising at least one quantum bit, or a multiple-input multiple-output architecture preferably in a wired or wireless manner.

10. The system according to claim 1,
wherein the system comprises at least one amplifier for amplifying at least a part or each of the mixer inputs from the baseband signal generator and/or the multitone source, at least a part or each of the mixer signal outputs, or any combinations thereof.

11. The system according to claim 1,
wherein the system comprises a combiner for combining the mixer output of at least a part, especially each, of the corresponding ones of the at least one mixer, preferably at least two mixers, to a single signal.

12. The system according to claim 1,
wherein the at least one mixer comprises or is at least one IQ mixer,
wherein at least one or each of the at least one IQ mixer especially comprises a first mixer input, second mixer input, a third mixer input, and a mixer output.

13. A system comprising:
a modulated RF signals generating system according to claim 1, and
a multiple-state system especially comprising or being a quantum computing architecture or a multiple-input multiple-output architecture,
wherein in the case that the multiple-state system comprises or is a quantum computing architecture, the modulated RF signals generating system is used to control at least a part, especially each, of the multiple states of the multiple-state system or to read out at least a part, especially each, of the correspondingly stored information of the multiple-state system, or
wherein in the case that the multiple-state system comprises or is a multiple-input multiple-output architecture, the modulated RF signals generating system is used to control or read out at least a part, especially each, of the multiple states of the multiple-state system.

14. The system according to claim 13,
wherein the multiple-state system comprises or is a quantum computing architecture, especially a quantum computing architecture comprising at least one quantum bit, or a multiple-input multiple-output architecture, especially a multiple-input multiple-output architecture comprising at least one antenna array.

15. The system according to claim 13,
wherein the at least one mixer is operated at a lower temperature, preferably within a dilution refrigerator or any other type of cryostat, as the ambient temperature.

16. A method for generating modulated RF signals for controlling or reading-out a multiple-state system, preferably a quantum computing architecture or a multiple-input multiple-output architecture, the method comprising the steps of:
providing at least one baseband signal preferably with the aid of a baseband signal generator,
providing a reference frequency signal preferably with the aid of a reference frequency source being in unidirectional or bidirectional communication with the baseband signal generator,
providing at least one multitone signal, especially a multitone signal, preferably with the aid of a multitone source being in unidirectional or bidirectional communication with the reference frequency source,
locking the corresponding phase between the at least one baseband signal and the at least one multitone signal, especially the multitone signal, preferably with the aid of the reference frequency signal, and mixing the corresponding one of the at least one baseband signal with the respective one of the at least one multitone signal, especially the multitone signal, to form at least one mixer output signal preferably with the aid of at least one mixer.

17. The method according to claim 16,
wherein the method further comprises the step of:
forming at least one control or read-out signal on the basis of at least a part, especially each, of the at least one mixer output signal.

18. The method according to claim 16,
wherein the multitone signal is generated with the aid of a frequency comb, a series of phase-locked loops which outputs are especially combined with the aid of a combiner, a digital-to-analog converter, a mixer fed from a local oscillator and a baseband signal, an optical down conversion, or any combination thereof.

19. The method according to claim 16,
wherein at least a part or each of the at least one multitone signal, especially the multitone signal, comprises at least two tones, and/or
wherein at least a part or each of the at least one multitone signal, especially the multitone signal, is generated on the basis of at least one setting input, and/or
wherein at least a part or each of the at least one baseband signal is generated on the basis of at least one control input.

20. The method according to claim 16,
wherein the method further comprises the step of:
filtering at least a part or each of the at least one baseband signal, at least a part or each of the at least one multitone signal, especially the multitone signal, at least a part or each of the at least one mixer output signal, or any combination thereof preferably with the aid of at least one filter.

* * * * *